United States Patent [19]

Magyar

[11] 4,109,962
[45] Aug. 29, 1978

[54] ANCHORAGE SYSTEM FOR A SEAT BELT

[75] Inventor: Joseph J. Magyar, Rochester, Mich.

[73] Assignee: General Motors Corporation, Detroit, Mich.

[21] Appl. No.: 810,504

[22] Filed: Jun. 27, 1977

[51] Int. Cl.² .............................................. A62B 35/00
[52] U.S. Cl. ..................................... 297/385; 297/388
[58] Field of Search ..................... 297/388, 385, 216; 248/429; 242/107.4 R

[56] References Cited

U.S. PATENT DOCUMENTS

| 3,032,374 | 5/1962 | Robinson et al. | 297/388 |
| 3,147,995 | 9/1964 | Bohlin | 297/385 |
| 3,288,422 | 11/1966 | Krause | 248/429 |
| 3,323,829 | 6/1967 | Liem | 297/388 |
| 3,606,454 | 9/1971 | Dorn | 297/385 |
| 3,746,393 | 7/1973 | Andres | 297/385 |
| 3,806,195 | 4/1974 | Frey | 297/385 |

Primary Examiner—James T. McCall
Attorney, Agent, or Firm—Charles E. Leahy

[57] ABSTRACT

A vehicle seat has a frame mounted on the vehicle floor by a fore and aft seat adjusting mechanism. A reel is rotatably mounted on the seat frame. A flexible element has one end attached to the reel and the other end attached to the vehicle floor. A windup spring acts on the reel to wind and unwind the flexible element during longitudinal fore and aft adjusting movement of the seat frame and maintains the flexible element in a taut condition irrespective of the selected adjusted position. A pawl is pivotally movable into engagement of the reel to block unwinding rotation thereof. A seat belt strap is attached to the pawl so that loads imposed on the belt during occupant restraint actuate the pawl to the blocking condition whereby the flexible element is held at its then existing length to anchor the seat frame against movement relative the vehicle floor. Accordingly, a seat belt element such as a buckle strap can be mounted on the vehicle seat and the seat belt loads are transmitted to the vehicle floor without relying on the force sustaining capability of the seat adjusting track.

3 Claims, 3 Drawing Figures

ANCHORAGE SYSTEM FOR A SEAT BELT

The invention relates to a seat belt system and more particularly to means for anchoring a seat mounted belt system.

Conventional seat belt systems employ a seat belt buckle or like element which is positioned inboard the occupant seating position for engagement with a mating latch plate or like element provided outboard the occupant seating position. Connection of the buckle and latch plate disposes a safety belt across the body of the seated occupant for restraining the occupant against movement from the seat.

The inboard seat belt buckle in vehicles having bench seats is conventionally connected to the vehicle floor by a buckle strap which extends through the bight between the bottom cushion and the back cushion of the seat to mount the buckle in an occupant accessible position. Accordingly, as the seat is moved fore and aft on the seat adjusting mechanism which conventionally mounts the front seat on the vehicle floor, the effective length of the inboard buckle strap extending into occupant accessible position is increased as the seat moves rearwardly and decreased as the seat moves forwardly.

It is known that the inboard buckle strap may be mounted directly on the vehicle seat so that the position of the buckle relative the occupant remains unchanged as the seat is moved fore and aft. However, mounting of the strap directly on the seat has the disadvantage of requiring that the seat adjusting mechanism be strong enough to maintain the seat against movement by the momentum of the seated occupant which is transferred to the seat by the seat belt system.

It is known to provide a belt anchorage on the seat which transmits the seat belt load to the vehicle floor. For example, U.S. Pat. No. 3,147,995 to N. I. Bohlin discloses a strong metal bar attached to the vehicle floor behind the seat and slidably engaged by a bracket carried by the seat and attached to the seat belt for tilting into a locking position when the belt is loaded. U.S. Pat. No. 3,806,195 to Stuart M. Frey discloses a similar arrangement wherein a length of belt is connected to the vehicle floor and is engaged by a clamping arrangement operable by tension on the seat belt.

According to the present invention, a reel is rotatably mounted on a vehicle seat frame. A flexible element has one end attached to the reel and the other end attached to the vehicle floor. A windup spring acts on the reel to wind and unwind the flexible element during longitudinal fore and aft adjusting movement of the seat frame and maintains the flexible element in a taut condition irrespective of the selected adjusted position. A pawl is pivotally movable into engagement of the reel to block unwinding rotation thereof. A seat belt strap is attached to the pawl so that loads imposed on the belt during occupant restraint actuate the pawl to the blocking condition whereby the flexible element is held at its then existing length to anchor the seat frame against movement relative the vehicle floor. Accordingly, a seat belt element such as a buckle strap can be mounted on the vehicle seat and the seat belt loads can be transmitted to the vehicle floor without relying on the force sustaining capability of the seat adjusting track.

One feature, object and advantage of the invention is the provision of an improved system for anchoring a seat belt on a vehicle seat and anchoring the seat against movement relative the vehicle floor.

Another feature, object and advantage of the invention is the provision of a spring biased reel mounted on the seat frame for winding a flexible element having its end connected to the vehicle floor and a means for locking the reel against unwinding in response to a predetermined condition of seat occupant to anchor the seat frame against movement relative the vehicle floor.

Another feature, object and advantage of the invention is the provision of a spring biased reel on the seat frame for winding a flexible element attached to the vehicle floor and a pawl associated with the reel and adapted for actuation by a load imposed on a seat mounted belt strap to lock the reel against unwinding rotaton to anchor the seat and associated belt against movement relative to the vehicle floor.

These and other features, objects and advantages of the invention will become apparent upon consideration of the amended claims and the specification in which:

Figure 1:
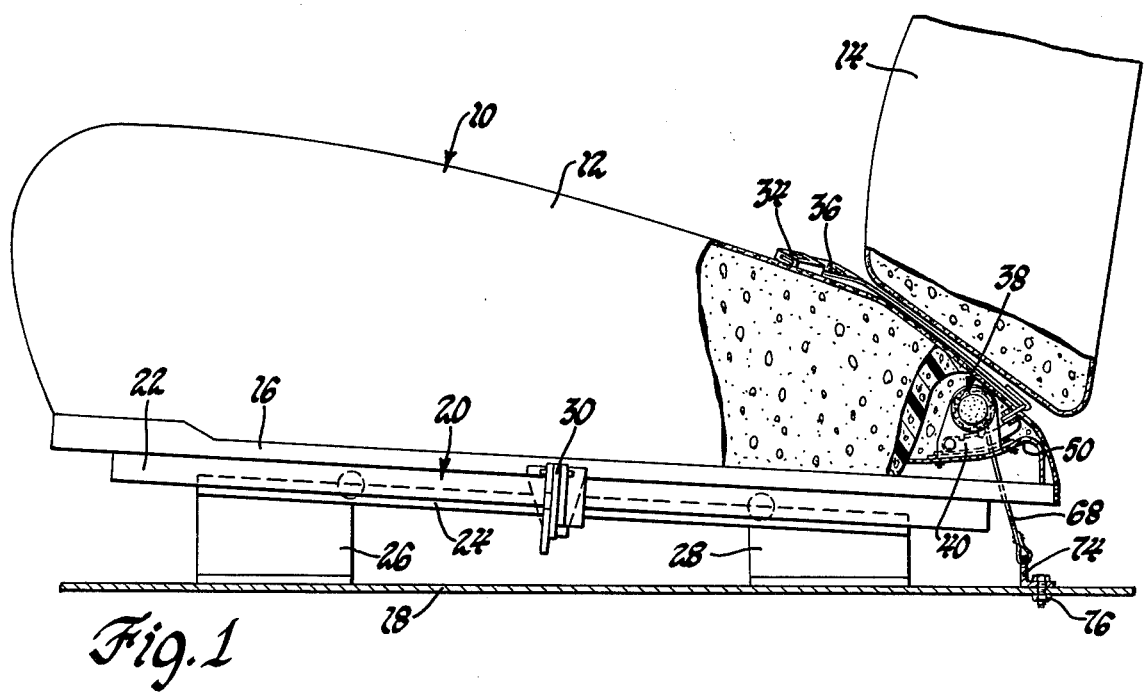
FIG. 1 is a side elevation view of a vehicle seat embodying the invention and having parts broken away and in section.

Referring now to FIG. 1, there is shown a vehicle bench seat generally indicated at 10 and including a seat bottom cushion 12 and a seat back cushion 14. The seat bottom cushion 12 has a frame 16 which is conventionally mounted for fore and aft adjusting movement relative the vehicle floor 18 by a seat adjusting mechanism, generally indicated at 20. The seat adjusting mechanism 20 generally includes an upper track 22 attached to the seat bottom frame 16, a lower track 24 attached to the vehicle floor by legs 26 and 28, and a releasable locking mechanism 30 for locking the tracks against relative movement. A suitable seat adjusting mechanism of this type is described fully in Tanaka et al. U.S. Pat. No. 3,310,274, assigned to the assignee of this invention. A seat belt buckle 34 is provided at the end of a short length of strap 36 which is routed through the bight between the back cushion 14 and bottom cushion 12.

Figure 2:
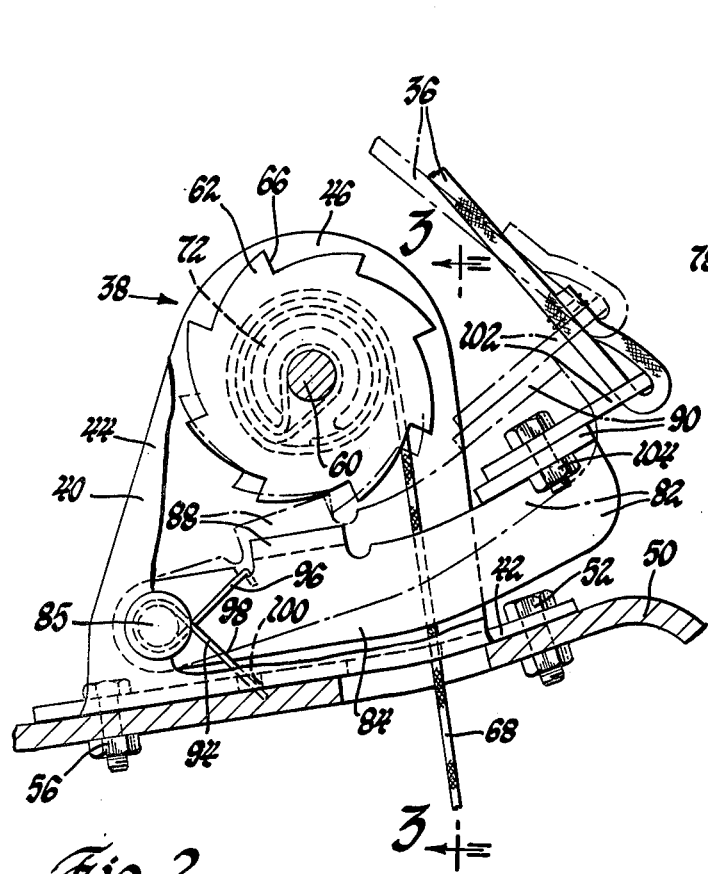
FIG. 2 is an enlarged fragmentary view of FIG. 1.
Figure 3:
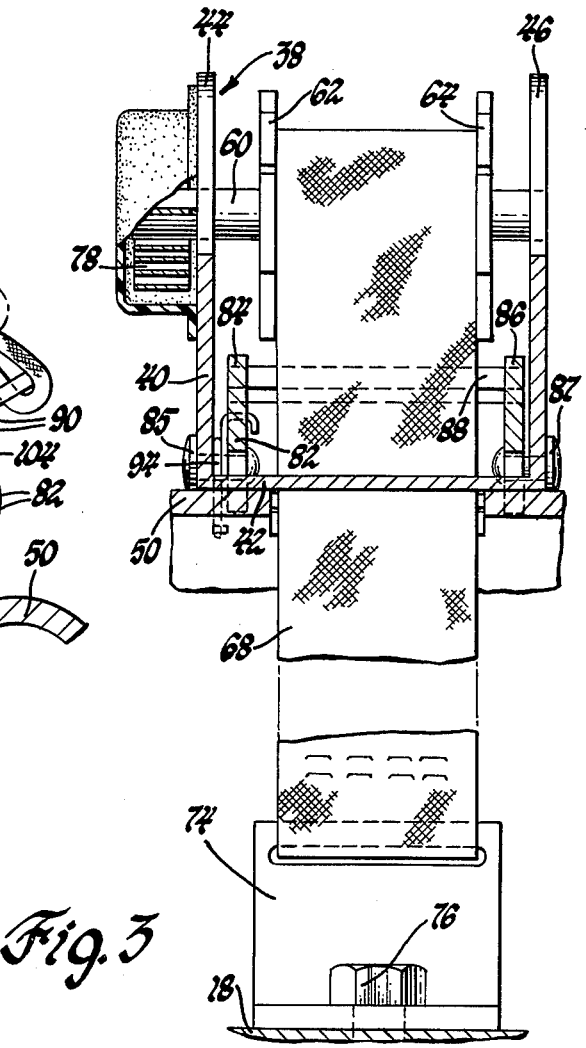
FIG. 3 is a sectional view taken in the direction of arrows 3—3 of FIG. 2.

A reel assembly generally indicated at 38 is mounted on the seat frame 16. Referring to FIGS. 2 and 3, it is seen that the reel assembly 38 includes a housing 40 having a base wall 42 and laterally spaced upstanding sidewalls 44 and 46. The base wall 42 is attached to a panel 50 of the seat bottom frame 16 by nut and bolt assemblies 52 and 56. The reel assembly 38 also includes a shaft 60 which has its ends rotatably journalled in apertures of the sidewalls 44 and 46. Ratchet wheels 62 and 64 are attached to the shaft 60 in spaced apart relation and having a plurality of ratchet teeth 66 disposed thereon. A flexible belt or cable 68 has its one end attached to the reel shaft 60 by a sleeve 72 and its other end attached to the vehicle floor by a bracket 74 and nut and bolt assembly 76. A spiral spring 78 acts between the housing sidewall 44 and the reel shaft 60 to rotate the shaft 60 in the counterclockwise direction as viewed in FIG. 2 so that the flexible belt 68 is maintained in a taut condition irrespective of the selected fore and aft adjusted position of the seat.

The reel assembly 38 also includes a pawl 82 selectively engageable with the ratchet teeth 66 of ratchet wheels 62 and 64 to block rotation of the shaft 60 in the direction which would unwind flexible belt element 68, thereby anchoring the seat cushion frame 16 against forward movement relative the vehicle floor 18. As best seen in FIGS. 2 and 3, the pawl 82 includes laterally spaced upstanding legs 84 and 86 which are respectively juxtaposed with the sidewalls 44 and 46 of the reel housing 40 and pivotally attached thereto by pivot pins 85 and 87. Pawl 82 also includes a lock bar portion 88 and a cross bar 90 which are integral with and extend between the legs 84 and 86. The lock bar portion 88 is engageable with the ratchet teeth 66 of the pawl upon upward pivotal movement of the pawl 82 from the solid-line position of FIG. 2 to the phantom-line position of FIG. 2. A torsion spring 94 encircles the pivot pin 85 and has a leg 96 which is engaged over the pawl 82 and another leg 98 which seats in an aperture 100 of the housing base wall 42. The spring 94 biases the pawl 82 to the solid-line position of FIG. 2 and yields to permit pivotal movement of the pawl 82 to the phantom-line position of FIG. 2 wherein the lock bar portion 88 is engaged with the ratchet teeth 66 of ratchet wheels 62 and 64.

Referring again to FIG. 2, it is seen that the end of the buckle strap 36 extends through a slot in a mounting plate 102 and is sewn on itself to provide an attachment therewith. A nut and bolt assembly 104 acts between the mounting plate 102 and the cross bar portion 90 of pawl 82 to effect a connection between the buckle strap 36 and the pawl 82.

OPERATION

Referring to FIGS. 1 and 2, it will be understood that the torsion spring 94 normally maintains the pawl 82 in its solid-line position of FIG. 2 wherein the lock bar portion 88 thereof is disengaged from the ratchet teeth 66 to permit free rotation of the reel shaft 60. Accordingly, as the vehicle seat is adjusted in the forward direction, the flexible belt 68 will be unwound. During adjusting movement of the seat in the rearward direction, the spiral spring 78 associated with the reel shaft 60 will rotate the reel shaft 60 in the counterclockwise direction to maintain the flexible belt 68 in the taut condition. The seat occupant dons the seat belt system by the engagement of a latch plate, not shown in the drawings, within the buckle 34. Accordingly, when the vehicle experiences a condition of rapid deceleration, the forward momentum of the occupant will impose a force upon the belt system. This force is transferred through the buckle 34 to the buckle strap 36 and carries the pawl 82 into locking engagement of the ratchet wheels 62 and 64. Upon such engagement of the lock bar portion 88 with the ratchet teeth 66, the unwinding rotation of the shaft 60 is blocked so that the flexible belt 68 is maintained at a fixed length thereby anchoring the seat cushion frame 16 relative the vehicle floor.

Termination of the loading on the belt sysem allows the torsion spring 94 to return the pawl 82 to its disengaged solid-line position of FIG. 2 permitting free fore and aft adjustment of the vehicle seat. It will be appreciated that the strength of the torsion spring 94 may be varied to provide a desired mode of operation. For example, many conventional seat belt systems employ a spring biased reel located outboard the vehicle seat for storage of an outboard segment of the belt system which carries the latch plate. Accordingly, it may be desirable to have a relatively low strength torsion spring 94 so that the effort of the windup spring of the outboard belt segment will impose sufficient loading on the inboard belt strap 36 to carry the pawl into locking engagement of the ratchet wheels 62 and 64. In that case, the vehicle seat would be blocked from forward movement whenever the seat belt was donned and it would be necessary to disengage the buckle from the latch plate or otherwise relieve the loading on the inboard belt strap 36 whenever it was desired to adjust the seat.

Furthermore, it will be understood that the buckle strap 36 need not be connected directly with the pawl 82. For example, the buckle strap 36 could be anchored on the cushion frame panel 50 and extend into engagement of the pawl 82 in such a manner as to result in upward movement of the pawl 82 upon tensioning of the buckle strap 36. Accordingly, it will be recognized that the pawl 82 could be actuated in response to any desired condition of seat occupancy or vehicle operation such as closure of the vehicle door, starting of the engine, etc.

Furthermore, it will be understood that the use of this invention may be particularly desirable in electrically adjustable seats where the seat tilts and/or moves vertically in addition to fore and aft adjusting movement.

Thus, it is seen that the invention provides an improved seat belt system wherein a reel assembly is provided to anchor the seat frame against movement relative the vehicle floor so that a seat belt buckle may be attached directly to the frame of the vehicle seat.

The embodiments of the invention in which an exclusive property or privilege is claimed are defined as follows:

1. In a motor vehicle body having an occupant seat frame and seat adjusting means acting between the vehicle floor and the seat frame to permit adjusting movement of the seat frame, a seat belt anchorage comprising: a reel rotatably mounted on the seat frame; a flexible element having one end attached to the reel and the other end attached to the vehicle floor; a windup spring acting on the reel to wind and unwind the flexible element during adjusting movement of the seat frame and maintain the flexible element in taut condition when the seat is adjusted to a desired position; a pawl selectively actuatable to locking engagement with the reel to block unwinding rotation thereof; and a seat belt attached to the pawl so that force imposed on the seat belt actuates the pawl to the locking condition whereby the seat frame is anchored against movement relative the vehicle floor by the seat belt load transferred thereto.

2. In a motor vehicle body having an occupant seat frame and seat adjusting means acting between the vehicle floor and the seat frame to permit adjusting movement of the seat frame, a seat belt anchorage comprising: a reel rotatably mounted on the seat frame; a flexible element having one end attached to the reel and the other end attached to the vehicle floor; a windup spring acting on the reel to wind and unwind the flexible element during adjusting movement of the seat frame and maintain the flexible element in taut condition when the seat is adjusted to a desired position; a pawl pivotally mounted for locking engagement with the reel to block unwinding rotation thereof, spring means urging the pawl away from locking engagement; and a seat belt attached to the pawl so that force imposed on the seat belt during restraint of a seated occupant overcomes the spring means and actuates the pawl to the locking condition whereby the seat frame is anchored by the flexible element against movement relative the vehicle floor by the seat belt load transferred thereto.

3. In a motor vehicle body occupant seat having a seat frame and seat adjusting means acting between the vehicle floor and the seat frame to permit adjusting movement of the seat, a seat belt system for restraining the occupant in the seat comprising: an occupant restraining seat belt associated with the seat and having one portion mounted on the vehicle body by a retractor outboard the seated occupant and another portion adapted for detachable connection inboard the seated occupant; a reel frame attached to the seat frame inboard the occupant; a reel rotatably mounted on the reel frame; a flexible element having one end attached to the reel and the other end attached to the vehicle floor rearwardly of the reel; a windup spring acting on the reel to wind and unwind the flexible element during adjusting movement of the seat frame and maintaining the flexible element in taut condition when the seat attains a desired adjusted position; a pawl pivotally mounted on the reel frame for selective locking engagement with the reel to block unwinding rotation thereof; a seat belt connecting element attached to the pawl for detachable connection with the seat belt to position the belt about the seat occupant; and spring means normally poising the pawl in an unlocking position away from locking engagement with the reel and maintaining the unlocking position upon tensioning of the seat belt about the occupant by the effort of the retractor and yielding upon imposition of seat belt loads during restraint of a seated occupant to allow movement of the pawl into locking engagement whereby the seat frame, the reel frame, and the connecting element are anchored by the flexible element against forward movement relative the vehicle floor independently of the load-sustaining capability of the seat adjusting means.

* * * * *